(12) United States Patent
Styles

(10) Patent No.: US 7,652,670 B2
(45) Date of Patent: Jan. 26, 2010

(54) POLYNOMIAL ENCODING OF VERTEX DATA FOR USE IN COMPUTER ANIMATION OF CLOTH AND OTHER MATERIALS

(75) Inventor: Andrew Graham Styles, San Diego, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 264 days.

(21) Appl. No.: 11/349,364

(22) Filed: Feb. 6, 2006

(65) Prior Publication Data

US 2007/0182744 A1 Aug. 9, 2007

(51) Int. Cl.
*G06T 15/70* (2006.01)
(52) U.S. Cl. .................. 345/473; 345/419; 345/420; 345/423; 345/474; 345/475
(58) Field of Classification Search .............. 345/473, 345/419, 427, 420, 474, 475
See application file for complete search history.

(56) References Cited

U.S. PATENT DOCUMENTS

| | | | |
|---|---|---|---|
| 5,504,845 A | 4/1996 | Vecchione | |
| 6,476,804 B1* | 11/2002 | Costabel | 345/419 |
| 6,532,014 B1 | 3/2003 | Xu et al. | |
| 6,608,631 B1* | 8/2003 | Milliron | 345/647 |
| 6,909,431 B1 | 6/2005 | Anderson et al. | |
| 6,967,658 B2* | 11/2005 | Hunter et al. | 345/473 |
| 6,970,171 B2 | 11/2005 | Baraff et al. | |
| 7,091,977 B2 | 8/2006 | Jeong et al. | |
| 7,209,139 B1* | 4/2007 | Keet et al. | 345/427 |
| 7,298,374 B2 | 11/2007 | Styles | |
| 7,385,603 B2* | 6/2008 | Piponi | 345/423 |
| 7,463,265 B2 | 12/2008 | Styles | |
| 2005/0168460 A1* | 8/2005 | Razdan et al. | 345/419 |
| 2007/0030265 A1 | 2/2007 | Styles | |
| 2007/0030266 A1 | 2/2007 | Styles | |

OTHER PUBLICATIONS

Jakobsen, Thomas; "Advanced Character Physics;" Gama Network Presents: Gamasutra.com; CMP Media Inc.; Jan. 21, 2003; pp. 1-17; (http://www.gamasutra.com/resource_guide/20030121/jacobson_01.shtml).

(Continued)

*Primary Examiner*—Kimbinh T Nguyen
(74) *Attorney, Agent, or Firm*—Fitch, Even, Tabin & Flannery

(57) ABSTRACT

An alternative to cloth simulation in which a plurality of different poses for a material are established, and then each component of each vertex position of the material is encoded into a polynomial by using corresponding vertices in the plurality of different poses for the material. The vertices are encoded relative to a neutral bind pose. The polynomial coefficients are calculated offline and then stored. At runtime, the poses are interpolated by using key variables which are input into the polynomials as different states, for example the turning speed of the player wearing the material, which may comprise a cloth jersey. The bind pose vertices are transformed into world space using the character skeleton. A smooth interpolation is achieved, and the polynomials can encode a large number of pose-meshes in a few constants, which reduces the amount of data that must be stored.

17 Claims, 5 Drawing Sheets

OTHER PUBLICATIONS

Malzbender, Tom et al.; "Polynomial Texture Maps;" presented at the Siggraph 2001 proceedings; May 15, 2001; pp. 1-10; (http://www.hpl.hp.com/research/ptm/papers/ptm.pdf).

Malzbender, Tom et al.; "Polynomial Texture Mapping (PTM);" Hewlett-Packard Laboratories; Research; pp. 1-2; 2001; http://www.hpl.hp.com/cgi-bin/printer-friendly.cgi.

USPTO, Office Action from U.S. Appl. No. 11/195,399; mailed Jan. 10, 2008; 7 pages.

USPTO, Office Action from U.S. Appl. No. 11/195,474; mailed Apr. 4, 2007; 7 pages.

USPTO, Notice of Allowance from U.S. Appl. No. 11/195,474; mailed Aug. 1, 2007; 4 pages.

USPTO; Notice of Allowance and Fee(s) Due issued in U.S. Appl. No. 11/195,399; mailed Aug. 8, 2008; 4 pages.

* cited by examiner

POLYNOMIAL ENCODING OF VERTEX DATA FOR USE IN COMPUTER ANIMATION OF CLOTH AND OTHER MATERIALS

BACKGROUND OF THE INVENTION

1. Field of the Invention

The present invention relates generally to computer graphics and animation, and more specifically to techniques for computer animation and movement of cloth, skin and other materials.

2. Discussion of the Related Art

Computer animation, such as is used in computer entertainment video game systems, is becoming more and more realistic. While the simulation and modeling of rigid bodies is fairly advanced, the simulation and modeling of non-rigid bodies such as cloth and clothing is still developing. Cloth is generally more difficult to simulate than rigid bodies because cloth reacts differently to forces such as wind, gravity, collisions with rigid bodies, etc.

The paper "Advanced Character Physics" by Thomas Jakobsen, dated Jan. 21, 2003 (http://www.gamasutra.com/resource_guide/20030121/jacobso n_01.shtml), which is incorporated by reference herein in its entirety, describes a Verlet integration scheme for cloth simulation. Verlet integration is a method of calculating classical physics in a way suitable to real-time simulations on computers. It is a method with more stability with larger steps in time than the equations usually used in Newtonian physics. It is most often used for molecular dynamics and real-time computer simulation of objects. A very similar method is often used as an optimized method of water ripple simulation.

It is with respect to these and other background information factors that the present invention has evolved.

SUMMARY OF THE INVENTION

The present invention advantageously addresses the needs above as well as other needs by providing a method for use in animation of a material. The method comprises the steps of: establishing a plurality of different poses for the material; and encoding each component of each vertex position of the material into a polynomial by using corresponding vertices in the plurality of different poses for the material; wherein the corresponding vertices in the plurality of different poses for the material are encoded relative to a bind pose.

Another embodiment of the present invention provides a computer program product comprising a medium for embodying a computer program for input to a computer. A computer program is embodied in the medium for causing the computer to perform steps of: establishing a plurality of different poses for a material; and encoding each component of each vertex position of the material into a polynomial by using corresponding vertices in the plurality of different poses for the material; wherein the corresponding vertices in the plurality of different poses for the material are encoded relative to a bind pose.

Another embodiment of the present invention provides a method for use in animation of a material. The method comprises the steps of: retrieving coefficients for a plurality of polynomials that define vertices of the material when a same set of variable values are used in each polynomial; assigning a value to each variable in the same set of variable values; computing a result of each polynomial using the values assigned to the same set of variable values to generate the vertices of the material; and transforming the vertices of the material into world space.

Another embodiment of the present invention provides a system for use in animation of a material. The system comprises: means for retrieving coefficients for a plurality of polynomials that define vertices of the material when a same set of variable values are used in each polynomial; means for assigning a value to each variable in the same set of variable values; means for computing a result of each polynomial using the values assigned to the same set of variable values to generate the vertices of the material; and means for transforming the vertices of the material into world space.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

Figure 1:
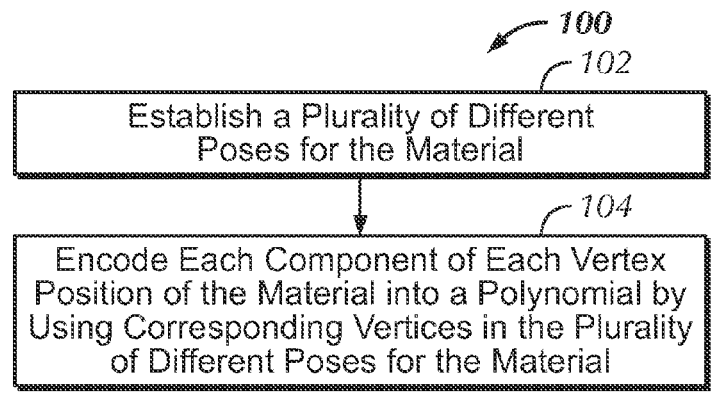
FIG. 1 is a flow diagram illustrating a method for use in the animation of a material in accordance with an embodiment of the present invention.

It has been found by the inventor hereof that the above-mentioned Verlet integration scheme for cloth simulation, which may also be referred to herein as the Verlet cloth simulator, has a number of disadvantages. Such disadvantages become apparent when the Verlet integration scheme is used for simulating clothing on an animated character. For example, unpredictable results sometimes occur such that the clothing bunches up in unwanted areas, stretches too much, or becomes too far removed from the animated character's body. Sometimes the clothing can even completely "pass through" the animated character's body. Furthermore, it is impractical on modern graphics hardware in real-time for the Verlet cloth simulator (or any other cloth simulation scheme) to provide a good "wrinkled" look to the simulated cloth.

Embodiments of the present invention help to overcome these and other disadvantages by providing an alternative to cloth simulation. The techniques described herein may be used in the animation and/or movement of cloth, skin and/or other materials. For example, the techniques described may be used in the real-time animation and/or movement of materials such as for example cloth, clothing (e.g. shirts, jerseys, shorts, other garments, etc.), skin (e.g. for frowns, etc.), hair, fur, flags, etc.

The techniques described herein may be used in connection with video games having one or more animated players, such as for example a basketball video game. The clothing that a player in the basketball game typically wears comprises a shirt or jersey and a pair of shorts. It should be well understood that there are numerous other types of games and animations to which embodiments of the present invention may be used and applied, such as for example other types of video games, movies, videos, animations, cartoons, etc.

The techniques and schemes described herein reduce the amount of data that needs to be saved to animate the movement of cloth and other materials. Such techniques can be used in many different types of computer graphics and animation applications, such as for example graphics workstations and video game applications of the type executed by video game consoles and similar devices. The techniques and schemes are useable on today's hardware and provide very good results.

Furthermore, the techniques may be run on graphics systems which may not have random-access to main memory. Thus, once the graphics system is preloaded with the data needed, the techniques can be applied, and persistent data saved out. And the methods may be run concurrently with other graphics tasks. On a multi processing core, the methods can be executed on a separate processor.

As mentioned above, embodiments of the present invention provide an alternative to cloth simulation. In general, in accordance with embodiments of the present invention, a number of cloth "poses" may be built in an art tool, perhaps using an offline cloth simulator, such as for example Maya® Cloth available from Alias Systems Corporation of Toronto, Ontario, Canada, or Syflex available from Syflex LLC. At runtime, the poses can be interpolated by using "key variables" which are input as different states, for example turning speed of the player. Interpolation is performed between the poses to fill them in and provide the material in the in between positions.

This technique can require a large amount of data. All of the data would have to be saved, which would require a large amount of memory. Furthermore, the interpolation between the poses would not be very smooth and would actually be a linear or straight line interpolation that would be somewhat rough.

Therefore, in accordance with embodiments of the present invention, each component (x, y, z) of the vertex position of the cloth or other material is encoded into a polynomial. This is referred to herein as polynomial encoding of vertex data for later use in cloth movement. The cloth poses are encoded and stored relative to the character in a neutral "bind pose", that is, pre-animation. Then during runtime, key variables are used to interpolate the polynomials to place the cloth or other material in the desired position. These key variables can be driven by the movement of the character, such as the current turning speed or vertical speed. In some embodiments the key variables may be normalized to between 0.0 and 1.0. The vertices can then be transformed from the bind pose into world space using standard animation/skinning techniques, using the skeletal bones of the animated character. The use of such polynomial encoding in this manner reduces the data that needs to be saved and provides a smooth interpolation between the poses rather than just a linear interpolation.

A technique for encoding textures as polynomials can be found in the paper entitled "Polynomial Texture Maps", by Tom Malzbender, Dan Gelb, and Hans Wolters, which was presented at the Siggraph 2001 proceedings (http://www.hpl.hp.com/research/ptm/papers/ptm.pdf), which is incorporated by reference herein in its entirety.

Referring to FIG. 1, there is illustrated a method 100 that operates in accordance with an embodiment of the present invention. The method 100 may be used in the animation of a material, such as clothing or any of the other materials mentioned above.

In step 102 the plurality of different poses for the material are established. For example, a few different poses of cloth jerseys can be pre-made with each jersey being in a different position to illustrate different movements of the jersey. Thus, several different positions of the material are assumed, and the different meshes are encoded.

Figure 2:
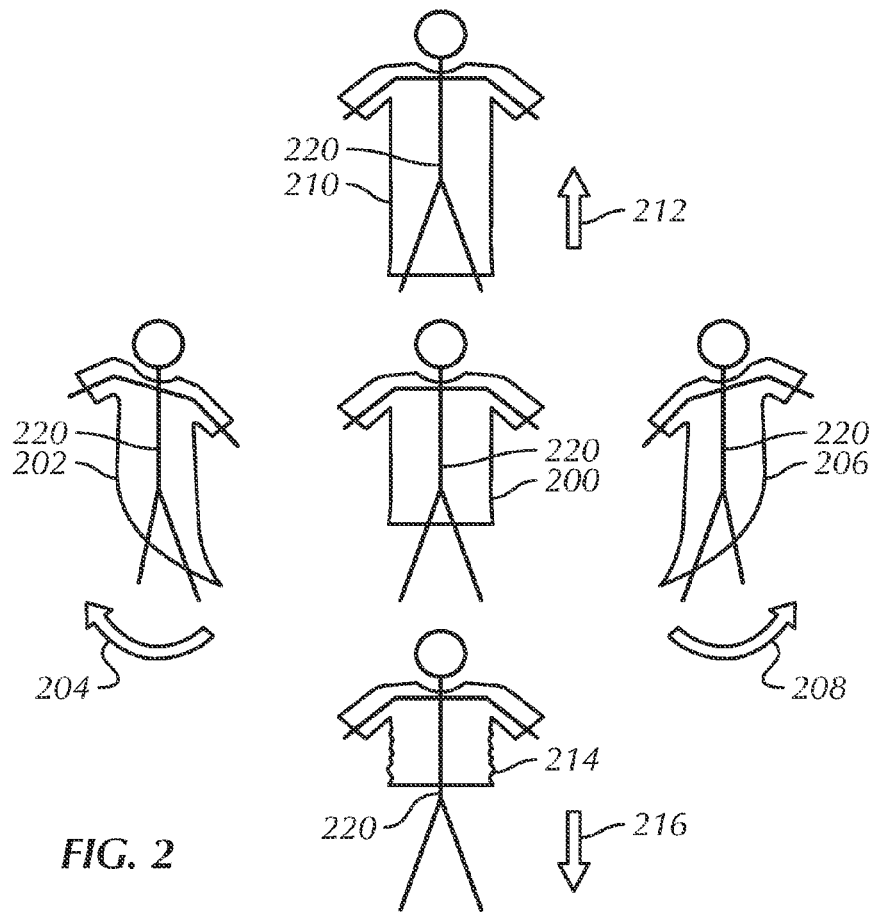
FIG. 2 is a pictorial diagram illustrating an example application of the method shown in FIG. 1 in accordance with an embodiment of the present invention.

FIG. 2 illustrates an example of several different poses for a material that comprises a cloth jersey. One jersey 200 is in the middle in a neutral or bind pose. A bind pose is a neutral position in which a character may be stored, such as with the legs together and arms in or out. Another jersey 202 is turning in one direction such as to its right 204, another jersey 206 is turning in the other direction such as to its left 208, another jersey 210 is moving or jumping up 212, and another jersey 214 is moving or jumping down 216. The jerseys are worn by a character skeleton 220. As shown, the jersey 202 turning to its right 204 is wrinkled or deformed such that the bottom of the jersey follows the turn, and the jersey 206 turning to its left 208 is similarly but oppositely deformed or wrinkled. The jersey 210 that is moving or jumping up 212 is stretched from the movement, while the jersey 214 that is moving or jumping down 216 is compressed from the movement. Thus, in this example five meshes are encoded, i.e. a middle default or bind pose 200, one turning right 202, one turning left 206, one going up 210, and one going down 214.

Figure 3:
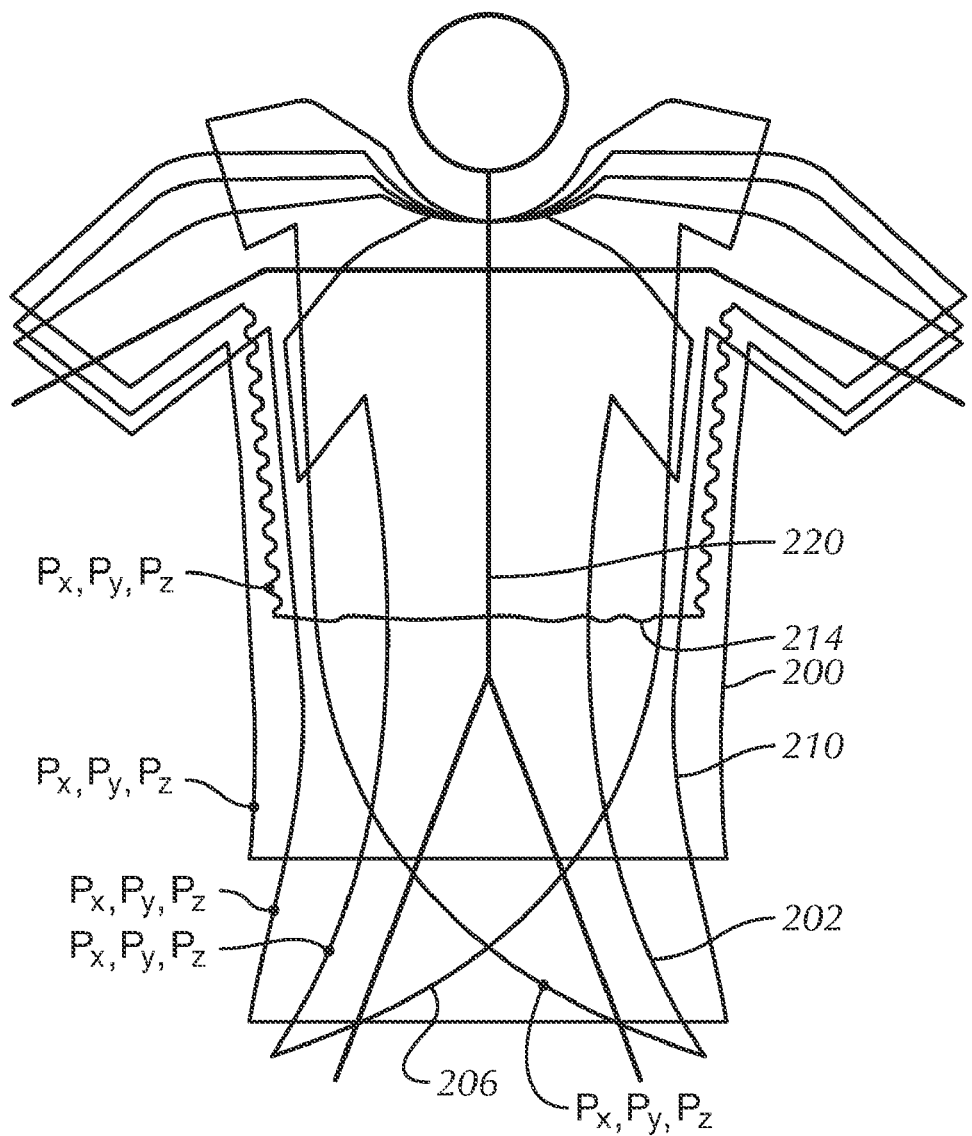
FIG. 3 is a pictorial diagram further illustrating an example application of the method shown in FIG. 1 in accordance with an embodiment of the present invention.

In step 104 (FIG. 1) each component of each vertex position of the material is encoded into a polynomial by using corresponding vertices in the plurality of different poses for the material. An example of this step is illustrated in FIG. 3 for the cloth jerseys.

Specifically, the vertices are encoded relative to the bind pose 200 of the character skeleton 220. Thus, as illustrated, each of the different poses 202, 206, 210 and 214 are positioned or stacked on top of the bind pose 200. The wrinkles in each different pose are preserved as the poses are translated into the bind pose. That is, each pose includes its unique wrinkles but is positioned relative to the bind pose. This way, the corresponding vertices in the plurality of different poses for the material are encoded relative to a bind pose.

Next, curves are fitted through the corresponding vertices in the different poses of the cloth jerseys. For example, a curve is fitted through the corresponding vertices $P_x$, $P_y$, $P_z$ in the different poses. In this way the polynomials for the x, y and z components of that particular vertex position of the jersey are approximated with a curve.

The process of encoding involves finding polynomial equations that approximate the different components of the curve fitted through the corresponding vertices $P_x$, $P_y$, $P_z$. The technique is applied to all three dimensions, and so a polynomial is found for each component of each point or vertex of the material. The polynomials are found that approximate the curve for each dimension x, y and z of the vertex position of the material so that all of the points are approximated by polynomials. By way of example, biquadratic polynomials are small and can be used to encode two-variable portions of a simulation. One variable can be used to control the left/right movement of the material and another variable can be used to control the up/down movement of the material. A mathematics software tool can be used to calculate the coefficients of the polynomial.

For example, the x-component $P_x$ of one vertex position of the cloth jersey, with inputs u and v, can be represented by the following biquadratic polynomial:

$$P_x(u,v) = a_{0x}u^2 + a_{1x}v^2 + a_{2x}uv + a_{3x}u + a_{4x}v + a_{5x} \quad (1)$$

where u is the amount that the jersey is turning left or right and v is the amount that the jersey is moving up or down. The polynomial coefficients $a_{0x}$, $a_{1x}$, $a_{2x}$, $a_{3x}$, $a_{4x}$, $a_{5x}$ are calculated based on the fitted curve and then saved. The stored coefficients are for polynomials that define the vertices of the jersey relative to the bind pose. Therefore, instead of storing hundreds of data points so the x-component of this vertex position can be represented in hundreds of different locations, all that is stored are the six coefficients $a_{0x}$, $a_{1x}$, $a_{2x}$, $a_{3x}$, $a_{4x}$, $a_{5x}$. This reduces the data set from hundreds of data points to just six numbers.

The equations are found for each dimension x, y and z. As such, the y-component $P_y$ and z-component $P_z$ of the vertex position of the cloth jersey are similarly represented by the following biquadratic polynomials:

$$P_y(u,v) = a_{0y}u^2 + a_{1y}v^2 + a_{2y}uv + a_{3y}u + a_{4y}v + a_{5y} \quad (2)$$

$$P_z(u,v) = a_{0z}u^2 + a_{1z}v^2 + a_{2z}uv + a_{3z}u + a_{4z}v + a_{5z} \quad (3)$$

where u and v are the same as defined above. Similar to above, the polynomial coefficients $a_{0y}$, $a_{1y}$, $a_{2y}$, $a_{3y}$, $a_{4y}$, $a_{5y}$, and $a_{0z}$, $a_{1z}$, $a_{2z}$, $a_{3z}$, $a_{4z}$, $a_{5z}$ are calculated based on the fitted curve and then saved. Therefore, instead of storing hundreds of data points so the y and z components of this vertex position can be represented in hundreds of different locations, all that is stored are the twelve coefficients. This reduces the data set from hundreds of data points to just twelve numbers.

Therefore, the use of such curve fitting and polynomial encoding allows each x, y, and z component of a vertex position of a material such as a cloth jersey to be compressed into one polynomial, and the coefficients of that polynomial are all that need to be stored. The data for all of the specific points does not have to be saved.

At runtime, the polynomials that define vertices of the material are used to animate and render the material in a desired position. Values for the variables are plugged into the polynomials and in this way the discrete data (i.e. the premade positions/points) is smoothed together at run time to provide a smooth transition to give the flow of the cloth.

In general, in accordance with an embodiment of the present invention, the stages during runtime may include determining the variables u and v for the polynomials based on character movement, generating the bind pose vertices by decoding with the polynomials, and then transforming the bind pose vertices into world space using the character skeleton. The transformation into world space may use the skinning information with which the cloth may be created.

Figure 4:
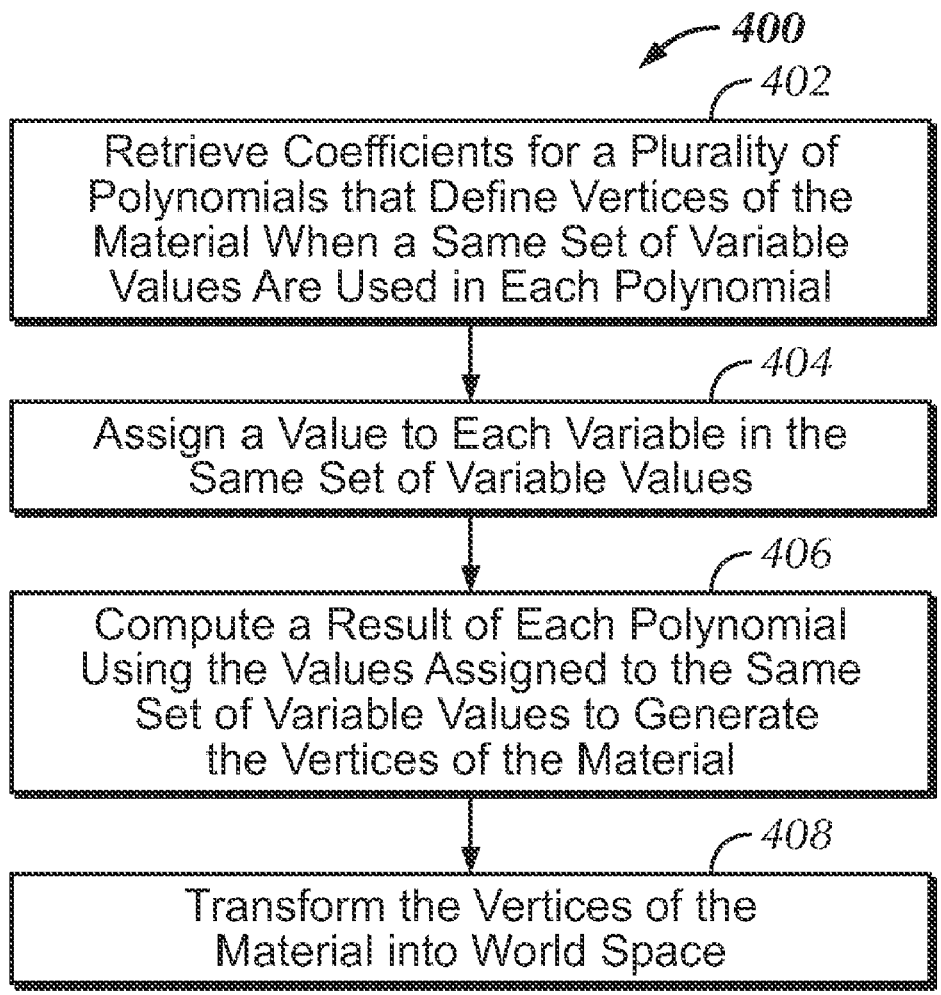
FIG. 4 is a flow diagram illustrating another method for use in the animation of a material in accordance with an embodiment of the present invention.

Specifically, referring to FIG. 4 there is illustrated a method 400 that operates in accordance with an embodiment of the present invention. The method 400 may be used in the animation of a material, such as clothing or any of the other materials mentioned above.

In step 402 the coefficients for a plurality of polynomials that define vertices of the material are retrieved from storage. Such storage may comprise any type of computer memory device. By way of example, the coefficients may be calculated as described above. The plurality of polynomials define vertices of the material when the same set of variable values are used in each polynomial. That is, when the same values for u and v are used in each polynomial the vertices for the material in a certain position will be calculated.

In step 404 a value is assigned to each variable in the same set of variable values. Thus, in the above example values are assigned to the variables u and v which will be used in all of the polynomials. Plugging the values of u and v into all of the polynomials will give the x, y, and z coordinates of all of the vertices of the material. For example, plugging in the assigned value for u and v into the $P_x$ function gives the x coordinate of that particular vertex position, plugging in the assigned value for u and v into the $P_y$ function gives the y coordinate of that particular vertex position, and plugging in the assigned value for u and v into the $P_z$ function gives the z coordinate of that particular vertex position.

The assigned values for the variables u and v are based on how much the material is turning or moving. For example, if the material comprises a cloth jersey worn by an animated character, such as the character skeleton 220, the variables u and v may be based on how much the character is turning or jumping up and down. As mentioned above, the variable u may be equal to the angular velocity that the body is rotating, and the variable v may be equal to the current velocity of the up or down movement of the body. Thus, values for u and v that represent the amount of left or right movement or turning speeds are plugged into the polynomials.

In some embodiments of the present invention the values of u and v may be scaled and normalized to the range of 0.0 to 1.0. For example, for the jerseys shown in FIG. 2, using a value of u=0.0 in the polynomials gives a jersey that looks like the jersey 202 on the left side that is turning to its right, using a value of u=0.5 in the polynomials gives a jersey that looks like the jersey 200 in the middle that is neutral (the original), and using a value of u=1.0 in the polynomials gives a jersey that looks like the jersey 206 on the right side that is turning to its left. Similarly, a value of v=0.0 in the polynomials gives a jersey that looks like the jersey 214 on the bottom that is moving down, using a value of v=0.5 in the polynomials gives a jersey that looks like the jersey 200 in the middle that is neutral (the original), and using a value of v=1.0 in the polynomials gives a jersey that looks like the jersey 210 on the top that is moving up.

The scaled and normalized values of u and v are not distance values but are instead rotation values indicating that the character has rotated or moved up or down. For example, in order to turn the character to its left the value of u is increased to 1.0. In order to stop turning the character the value of u is brought back to 0.5. In order to turn the character to its right the value of u is decreased to 0.0. And in order to stop turning the character the value of u is again brought back to 0.5. Thus, the value of u is increased above 0.5 to turn left and decreased below 0.5 to turn right and brought back to 0.5 to stop the turning. The value of u=0.5 is the standard or bind pose in the middle.

By using other values in the range of 0.0 to 1.0 for the variables u and v the components for the vertices of the cloth jersey for any of the in between positions can be calculated, which provide a jersey having the appropriate wrinkles or deformations. Thus, posing the different meshes in the different positions and encoding polynomials gives the ability to calculate how they transition from one to the other. Use of the polynomials provides a very smooth transition of the movement of the jersey as the variables u and v are changed.

In step 406 (FIG. 4) a result of each polynomial is computed using the values assigned to the same set of variable values to generate the vertices of the material. The computed results provides the coordinates of all the vertices of the material in the bind pose with the appropriate wrinkles or deformations. Namely, as described above, the vertices of the material are encoded relative to the bind pose 200 of the character skeleton 220 (FIGS. 2 and 3). Thus, the stored coefficients are for polynomials that define the vertices of the material relative to the bind pose.

Figure 5:
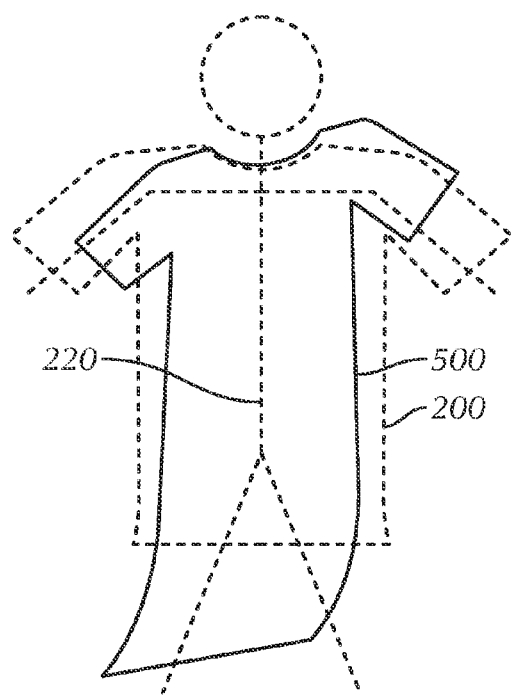
FIG. 5 is a pictorial diagram illustrating an example application of the method shown in FIG. 4 in accordance with an embodiment of the present invention.

For example, FIG. 5 illustrates an example for a cloth jersey 500 where u=0.7 and v=0.7. As shown, the polynomials provide the vertices of the cloth jersey 500 relative to the bind pose 200 of the character skeleton 220. The jersey 500 includes the appropriate wrinkles and deformations so that it looks like it is turning to its left slightly and moving up slightly. But at this point the jersey 500 is positioned at the bind pose.

Figure 6:
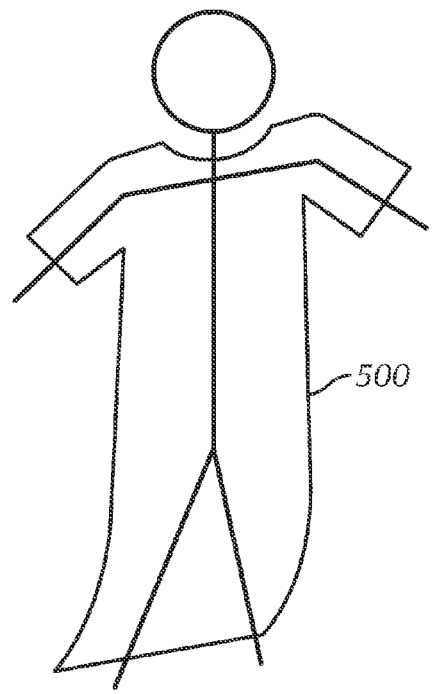
FIG. 6 is a pictorial diagram further illustrating an example application of the method shown in FIG. 4 in accordance with an embodiment of the present invention.

Finally, in step 408 (FIG. 4) the vertices of the material are transformed into world space. That is, the computed results of each polynomial are transformed from the bind pose into the desired position in world space. This may be done by running the vertices of the material through whatever transformation the character is currently running. Known skinning techniques may be applied to the material so that the run time code can use the skinning information to transform the material into world space. An example of such transformation is illustrated in FIG. 6, which shows the jersey 500 after being transformed into world space. The material may be rendered on any type of video display or the like. Thus, the cloth jersey 500 may be rendered in the position illustrated.

Therefore, as described herein curve-fitting mathematical techniques are used for multidimensional polynomial encoding of vertex data. The techniques are applied to cloth movement, and character movement is used as an input to the polynomials. The polynomial coefficients are calculated offline, and then the polynomials are quickly and easily decoded in a graphics processing unit (GPU) vertex program at runtime. In this way the cloth-poses are encoded as discrete poses and then they are smoothly interpolated using keyed variables. A smoother interpolation is achieved than by using direct morphing, and the polynomials can encode a large number of pose-meshes in a few constants.

Figure 7:
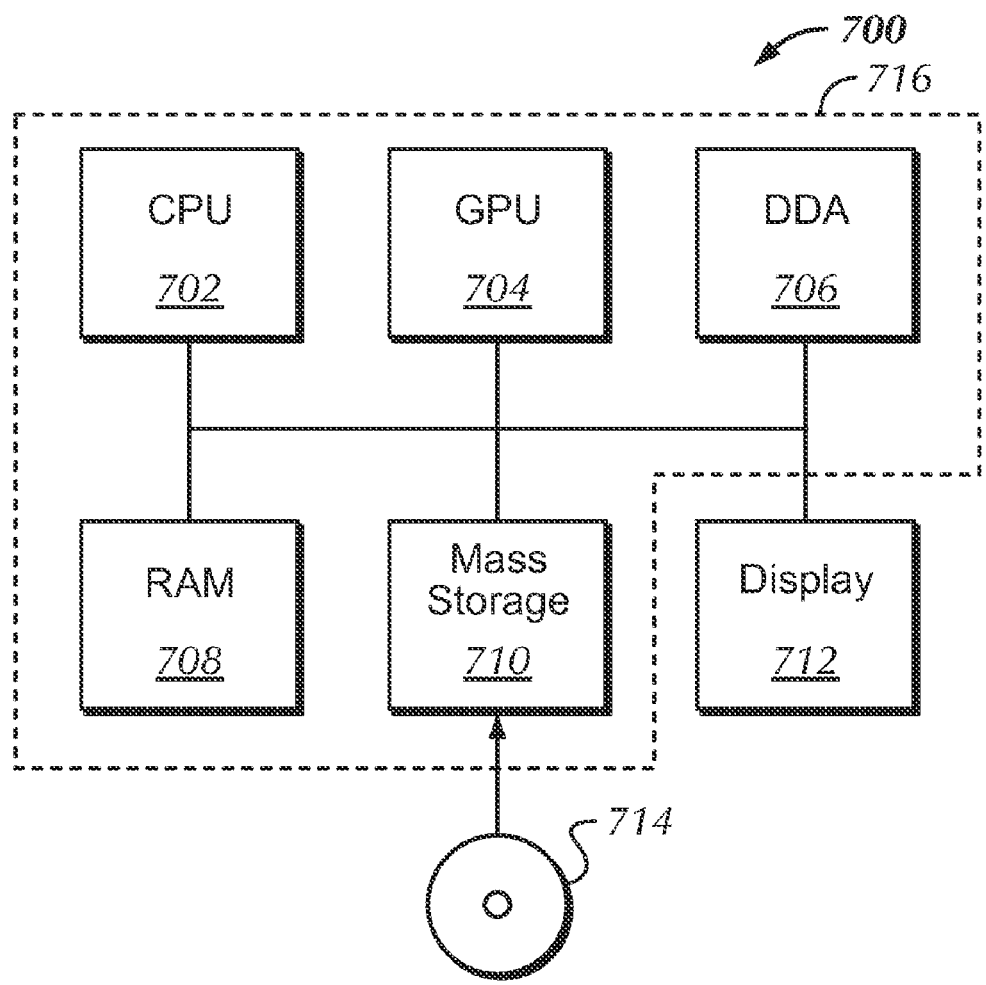
FIG. 7 is a block diagram illustrating a system that may be used to run and execute the methods shown in FIGS. 1 and 4 in accordance with embodiments of the present invention.

As mentioned above, the methods and techniques described herein may be utilized and run on many different types of computers, graphics workstations, video game systems and consoles, and the like. Referring to FIG. 7 there is illustrated such a system 700 that may be used to run the methods and techniques described herein. The system 700 includes a central processing unit (CPU) 702, a graphics processing unit (GPU) 704, digital differential analysis (DDA) hardware 706, a random access memory (RAM) 708, a mass storage unit 710, such as a disk drive, and a display monitor 712. The CPU 702 and/or GPU 704 can be used to execute the steps of the methods and techniques described herein, and the materials that are animated can be rendered on the display monitor 712. Removable storage media 714 may optionally be used with the mass storage unit 710, which may be used for storing code that implements the methods and techniques described herein. Any of the storage devices, such as the RAM 708 or mass storage unit 710, may be used for storing the polynomial coefficients. Either all or a portion of the system 700 may be embodied in a device 716, such as for example a computer or video game console or system. And as mentioned above, the simulations may be run concurrently with other graphics tasks. On a multi processing core, the simulations can be executed on a separate processor.

U.S. patent application Ser. No. 11/195,399, filed Aug. 2, 2005, entitled "CONSTRAINT SCHEMES FOR COMPUTER SIMULATION OF CLOTH AND OTHER MATERIALS", and U.S. patent application Ser. No. 11/195,474, filed Aug. 2, 2005, entitled "SCHEME FOR PROVIDING WRINKLED LOOK IN COMPUTER SIMULATION OF MATERIALS", are both incorporated herein by reference in their entirety.

While the invention herein disclosed has been described by means of specific embodiments and applications thereof, numerous modifications and variations could be made thereto by those skilled in the art without departing from the scope of the invention set forth in the claims.

What is claimed is:

1. A method for use in animation of a material, comprising the steps of:
    establishing a plurality of different poses for the material;
    encoding each component of each vertex position of the material into a polynomial by using corresponding vertices in the plurality of different poses for the material; and
    storing one or more coefficients for the polynomials in a computer storage medium;
    wherein the corresponding vertices in the plurality of different poses for the material are encoded relative to a bind pose;
    wherein the plurality of different poses for the material comprises the material in a neutral pose, the material turning in one direction, and the material turning in another direction.

2. A method in accordance with claim 1, wherein the plurality of different poses for the material further comprises the material moving up and the material moving down.

3. A method in accordance with claim 1, wherein each vertex position of the material comprises an x component, a y component, and a z component.

4. A method in accordance with claim 1, wherein each polynomial comprises a biquadratic polynomial.

5. A method in accordance with claim 1, further comprising the steps of:
    assigning a value to each variable in a same set of variable values;
    computing a result of each polynomial using the values assigned to the same set of variable values to generate vertices of the material; and
    transforming the vertices of the material into world space.

6. A computer program product comprising a medium for embodying a computer program for input to a computer and a computer program embodied in the medium for causing the computer to perform steps of:
    establishing a plurality of different poses for a material; and
    encoding each component of each vertex position of the material into a polynomial by using corresponding vertices in the plurality of different poses for the material;
    wherein the corresponding vertices in the plurality of different poses for the material are encoded relative to a bind pose;
    wherein the plurality of different poses for the material comprises the material in a neutral pose, the material turning in one direction, and the material turning in another direction.

7. A computer program product in accordance with claim 6, wherein the step of encoding comprises the step of:
    calculating coefficients for the polynomials.

8. A computer program product in accordance with claim 6, wherein the plurality of different poses for the material further comprises the material moving up and the material moving down.

9. A computer program product in accordance with claim 6, wherein each vertex position of the material comprises an x component, a y component, and a z component.

10. A computer program product in accordance with claim 6, wherein each polynomial comprises a biquadratic polynomial.

11. A computer program product in accordance with claim 6, wherein the computer program embodied in the medium is configured to cause the computer to perform further steps of:
   assigning a value to each variable in a same set of variable values;
   computing a result of each polynomial using the values assigned to the same set of variable values to generate vertices of the material; and
   transforming the vertices of the material into world space.

12. A method for use in animation of a material, comprising the steps of:
   retrieving, from a computer storage medium, coefficients for a plurality of polynomials that define vertices of the material when a same set of variable values are used in each polynomial;
   assigning a value to each variable in the same set of variable values;
   computing a result of each polynomial using the values assigned to the same set of variable values to generate the vertices of the material; and
   transforming the vertices of the material into world space;
   wherein the coefficients for the plurality of polynomials are based on polynomial encoding of corresponding vertices in a plurality of different poses for the material that comprises the material in a neutral pose, the material turning in one direction, and the material turning in another direction.

13. A method in accordance with claim 12, wherein the value assigned to each variable in the same set of variable values is based on movement of the material.

14. A method in accordance with claim 12, wherein each polynomial comprises a biquadratic polynomial.

15. A system for use in animation of a material, comprising:
   means for retrieving coefficients for a plurality of polynomials that define vertices of the material when a same set of variable values are used in each polynomial;
   means for assigning a value to each variable in the same set of variable values;
   means for computing a result of each polynomial using the values assigned to the same set of variable values to generate the vertices of the material; and
   means for transforming the vertices of the material into world space.
   wherein the coefficients for the plurality of polynomials are based on polynomial encoding of corresponding vertices in a plurality of different poses for the material that comprises the material in a neutral pose, the material turning in one direction, and the material turning in another direction.

16. A system in accordance with claim 15, wherein the value assigned to each variable in the same set of variable values is based on movement of the material.

17. A system in accordance with claim 15, wherein each polynomial comprises a biquadratic polynomial.

* * * * *

UNITED STATES PATENT AND TRADEMARK OFFICE
CERTIFICATE OF CORRECTION

PATENT NO. : 7,652,670 B2  Page 1 of 1
APPLICATION NO. : 11/349364
DATED : January 26, 2010
INVENTOR(S) : Andrew Graham Styles It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 613 days.

At Column 10, Line 20, in claim 15, please delete "space." and insert --space;-- therefor.

Signed and Sealed this

Twenty-third Day of November, 2010

David J. Kappos
*Director of the United States Patent and Trademark Office*